United States Patent
Iida

(10) Patent No.: US 10,801,668 B2
(45) Date of Patent: Oct. 13, 2020

(54) MANUFACTURING METHOD FOR TANK

(71) Applicant: TOYOTA JIDOSHA KABUSHIKI KAISHA, Toyota-shi, Aichi-ken (JP)

(72) Inventor: Yasuhiro Iida, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 16/424,614

(22) Filed: May 29, 2019

(65) Prior Publication Data

US 2020/0072414 A1 Mar. 5, 2020

(30) Foreign Application Priority Data

Aug. 31, 2018 (JP) ................... 2018-162354

(51) Int. Cl.
*F17C 1/06* (2006.01)
*B29C 63/10* (2006.01)

(52) U.S. Cl.
CPC ............... *F17C 1/06* (2013.01); *B29C 63/10* (2013.01); *F17C 2203/0604* (2013.01); *F17C 2203/067* (2013.01); *F17C 2203/0614* (2013.01); *F17C 2203/0665* (2013.01)

(58) Field of Classification Search
CPC ........ F17C 2203/0665; F17C 2203/067; F17C 1/06; F17C 2203/0604; F17C 2203/0614; B29C 63/10
See application file for complete search history.

(56) References Cited

U.S. PATENT DOCUMENTS

| | | | |
|---|---|---|---|
| 2012/0024746 A1 | 2/2012 | Otsubo | |
| 2013/0087567 A1* | 4/2013 | Kaneko | F17C 1/16 220/590 |
| 2016/0339632 A1* | 11/2016 | Kato | B65H 54/10 |

FOREIGN PATENT DOCUMENTS

| | | |
|---|---|---|
| JP | 2015-112813 A | 6/2015 |
| WO | 2010/116526 A1 | 10/2010 |

* cited by examiner

*Primary Examiner* — Vishal I Patel
(74) *Attorney, Agent, or Firm* — Dickinson Wright PLLC

(57) ABSTRACT

A manufacturing method for a tank is a method of manufacturing a tank by winding fibers impregnated with a resin in a plurality of layers on an outer circumference of a liner, and the manufacturing method includes: laminating a plurality of hoop layers by hoop-winding the fibers impregnated with the resin; and laminating a plurality of helical layers by helical-winding the fibers impregnated with the resin such that the helical layers wrap the hoop layers. When laminating the helical layers, a temperature of the fibers impregnated with the resin is adjusted at 40° C. or more and 60° C. or less.

5 Claims, 4 Drawing Sheets

MANUFACTURING METHOD FOR TANK

INCORPORATION BY REFERENCE

The disclosure of Japanese Patent Application No. 2018-162354 filed on Aug. 31, 2018 including the specification, drawings and abstract is incorporated herein by reference in its entirety.

BACKGROUND

1. Technical Field

The present disclosure relates to a manufacturing method for a tank that manufactures a tank by winding fibers impregnated with a resin in a plurality of layers on an outer circumference of a liner.

2. Description of Related Art

Tanks such as hydrogen tanks installed in fuel cell vehicles are required to have a high strength, etc., in order to ensure safety. As a method of manufacturing such tanks, a filament winding (FW) method described in WO 2010/116526 A is known, for example. That is, this method is a manufacturing method of repeatedly winding fibers impregnated with an uncured thermosetting resin around the outer circumference of the liner so as to form hoop layers and helical layers on the outer side of the hoop layers, and thereafter thermosetting the thermosetting resin.

SUMMARY

In the above-described manufacturing method, when the layer-formation is switched from formation of the hoop layers to formation of the helical layers, the orientation of the fibers is changed, so that the permeation of the resin with which the fibers are impregnated becomes deteriorated; thus voids (i.e. pores) are likely to be generated. Generation of voids causes deterioration in an initial strength or a fatigue strength of the tank.

The present disclosure is a manufacturing method for a tank, capable of reducing generation of voids as well as improving strength of the tank.

A manufacturing method for a tank according to one aspect of the present disclosure is a manufacturing method for a tank that manufactures the tank by winding fibers impregnated with a resin in a plurality of layers on an outer circumference of a liner, and the manufacturing method includes: laminating a plurality of hoop layers by hoop-winding the fibers impregnated with the resin; and laminating a plurality of helical layers by helical-winding the fibers impregnated with the resin such that the helical layers wrap the hoop layers, wherein when laminating the helical layers, a temperature of the fibers impregnated with the resin is adjusted at 40° C. or more and 60° C. or less.

In the manufacturing method for the tank according to one aspect of the present disclosure, by adjusting the temperature of the fiber impregnated with a resin at 40° C. or more and 60° C. or less when laminating the helical layers, it is possible to decrease the viscosity of the resin with which the fibers are impregnated, to thus enhance the permeation property of the resin. Therefore, even in the case in which the orientation of the fibers is changed when the layer-formation is switched from formation of the hoop layers to formation of the helical layers, or the like, the permeation of the resin can be promoted, to thereby reduce generation of voids and enhance the strength of the tank.

In the manufacturing method for the tank according to one aspect of the present disclosure, when the tank is manufactured by using a manufacturing apparatus equipped with a resin fiber feeding roller feeding the fibers impregnated with the resin, when laminating the helical layers, the temperature of the fibers impregnated with the resin may be adjusted by frictional heat generated by controlling a rotation of the resin fiber feeding roller. With this configuration, it is possible to cope with the temperature adjustment by using only the existing facilities without providing additional facilities, and thus it is possible to maintain the cost at a low level.

In the manufacturing method for the tank according to one aspect of the present disclosure, when the tank is manufactured by using a manufacturing apparatus equipped with a heater, when laminating the helical layers, the temperature of the fibers impregnated with the resin may be adjusted by the heater. With this configuration, it is possible to cope with the temperature adjustment by using only the existing facilities, and also to prevent the fibers impregnated with the resin from being damaged.

In the manufacturing method for the tank according to one aspect of the present disclosure, when laminating the helical layers, the temperature of the fibers impregnated with the resin may be adjusted at 40° C. or more and 50° C. or less.

In the manufacturing method for the tank according to one aspect of the present disclosure, the controlling of the rotation of the resin fiber feeding roller may include: rotating the resin fiber feeding roller in the same direction as a rotating direction of the liner; rotating the resin fiber feeding roller in a direction reverse to the rotating direction of the liner; and stopping the rotation of the resin fiber feeding roller.

According to the above aspects, it is possible to reduce generation of voids, to thus promote enhancement of the strength of the tank.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of a manufacturing method for a tank will be explained with reference to the drawings. In the following description, fibers impregnated with an epoxy resin will be exemplified as fibers impregnated with a resin, but fibers impregnated with a polyester resin, a polyamide resin, or the like may also be used. Further, in order to avoid complication of explanation, in the following description, "fibers impregnated with an epoxy resin" may be abbreviated as "fibers" in some cases.

Figure 1:
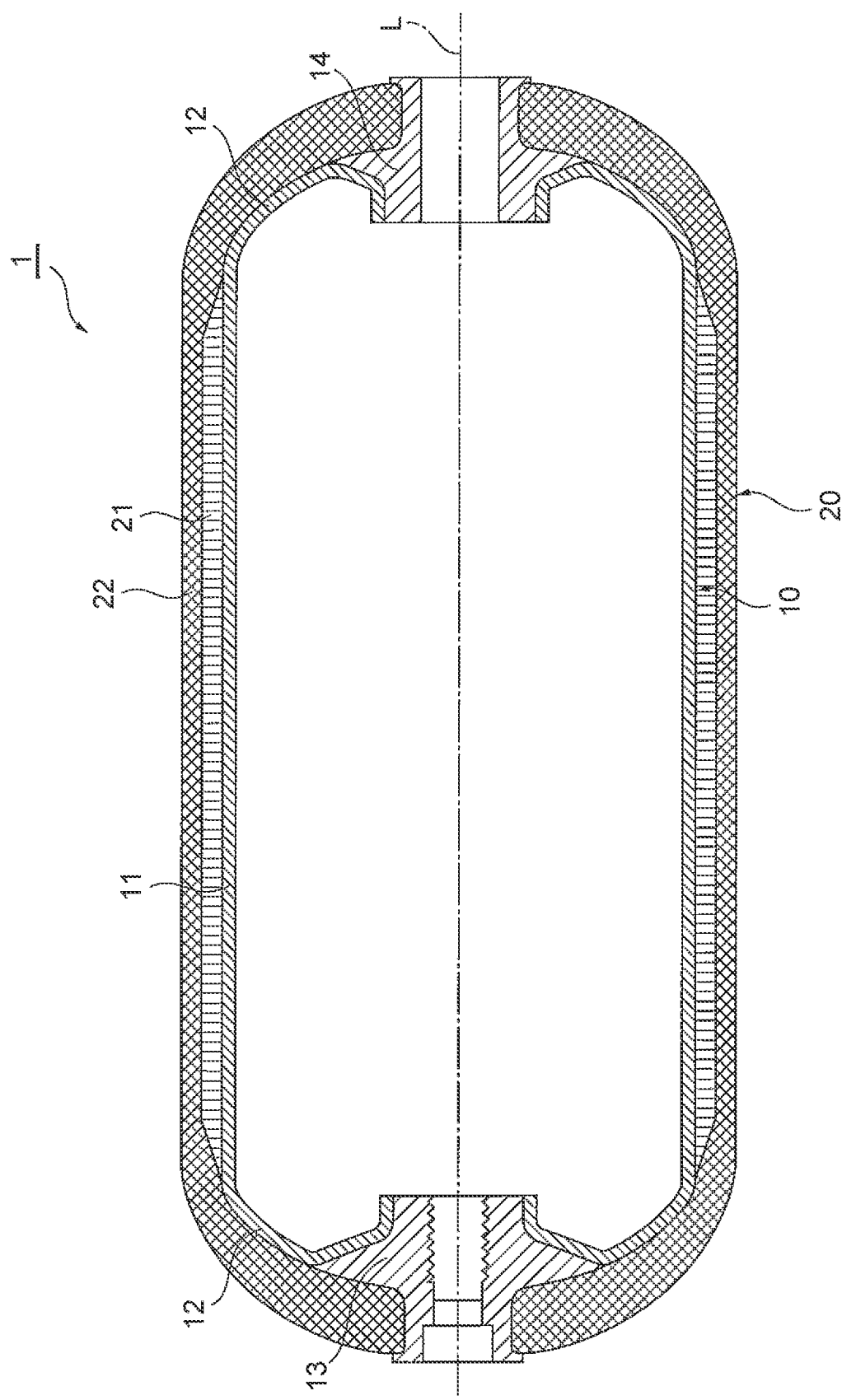
FIG. 1 is a sectional view showing a structure of a tank.

First, the structure of a tank will be described based on FIG. 1. FIG. 1 is a sectional view showing the structure of the tank 1. The tank 1 is a high-pressure tank installed in, for example, a fuel cell vehicle, and can store high-pressure hydrogen thereinside. The tank 1 is provided with a liner 10 having a fluid storage space and an FRP layer (i.e. a fiber reinforced plastic layer) 20 in tight contact with an outer circumference of the liner 10.

The liner 10 has a gas barrier property against hydrogen gas. The liner 10 is a hollow container including a substantially cylindrical body part 11, and substantially hemispherical dome parts 12 respectively provided at both left and right ends of the body part 11. Openings are formed at respective tops of the two dome parts 12, and a valve-side port ring 13 is inserted in one of these openings, and an end-side port ring 14 is inserted in the other of these opening.

This liner 10 is integrally formed by a rotation-blow molding method using, for example, a resin member, such as polyethylene and nylon. Further, the liner 10 may be formed of a light metal, such as aluminum, instead of the resin member. In addition, the liner 10 may be formed by joining a plurality of separate members formed by injection-extrusion molding or the like, instead of an integral-formation manufacturing method, such as a rotation-blow molding method.

The FRP layer 20 includes a plurality of hoop layers 21 laminated so as to cover an outer circumference of the body part 11 of the liner 10, and a plurality of helical layers 22 that totally covers the liner 10 in such a manner as to wrap the plurality of hoop layers 21 and the dome parts 12.

Figure 2:
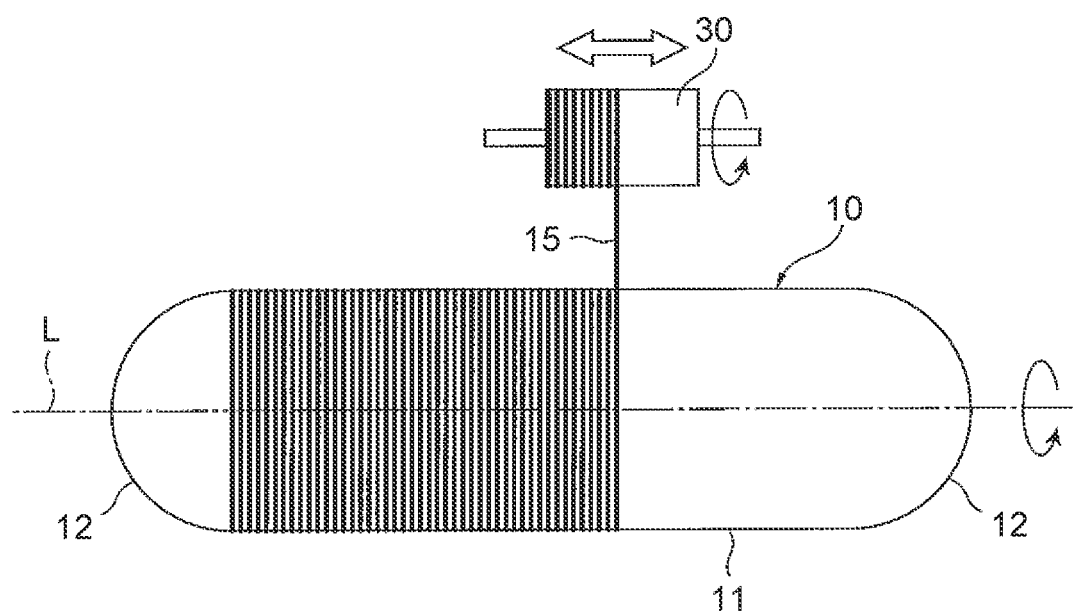
FIG. 2 is a schematic view explaining formation of hoop layers by hoop winding.

As shown in FIG. 2, the hoop layers 21 are fiber layers formed by hoop-winding fibers 15 impregnated with an epoxy resin in the circumferential direction of the body part 11 at a winding angle substantially perpendicular to the central axis L of the liner 10. Here, the expression "substantially perpendicular" includes both an angle of 90° and an angle of appropriately 90° that can be generated when winding positions of the fibers 15 are shifted such that the fibers 15 do not overlap with each other.

Figure 3:
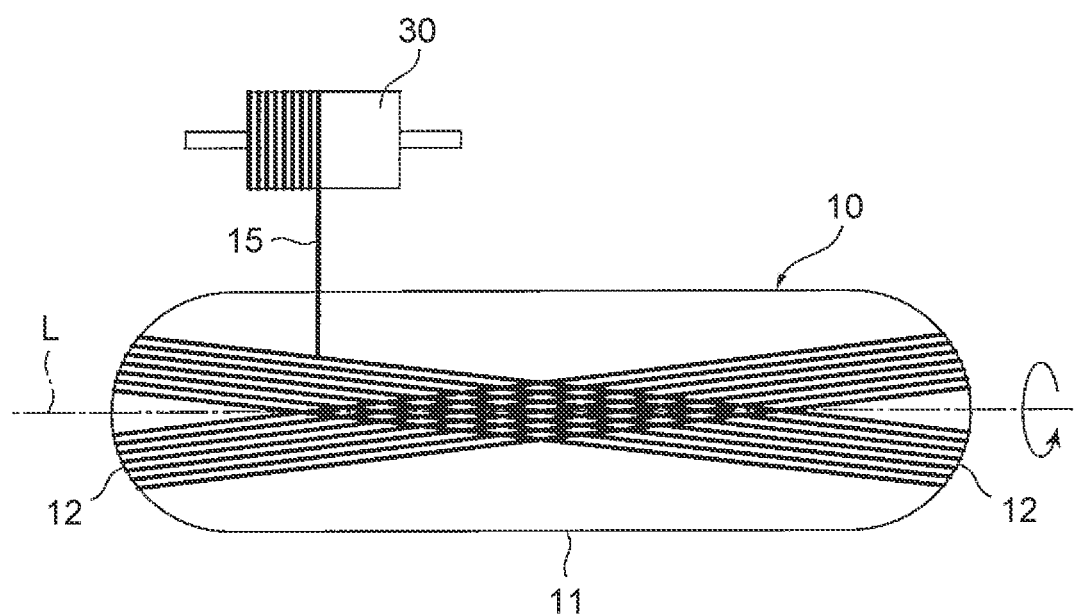
FIG. 3 is a schematic view explaining formation of helical layers by helical winding.

On the other hand, as shown in FIG. 3, the helical layers 22 are formed by helically winding the fibers 15 in the circumferential direction of the body part 11 and the dome parts 12 at a winding angle of more than 0° and less than 90° relative to the central axis L of the liner 10. The helical winding can be classified into a low-angle helical winding and a high-angle helical winding depending on the winding angle. The low-angle helical winding is a helical winding when the winding angle is small (e.g. more than 0° and 30° or less), and is a winding method in which a turnback of the fibers 15 in the winding direction occurs in the dome part 12 before the fibers 15 are wound around the central axis L by one round. The high-angle helical winding is a helical winding when the winding angle is great (e.g. more than 30° and less than 90°), and is a winding method in which the fibers 15 are wound around the central axis L by at least one round in the body part 11 until a turnback of the fibers 15 in the winding direction occurs in the dome part 12. Note that FIG. 3 shows the low-angle helical winding.

Next, the manufacturing method for the tank 1 will be described. The manufacturing method for the tank 1 according to the present embodiment mainly includes: a hoop layer lamination step of sequentially laminating the plurality of hoop layers 21 on the outer circumference of the body part 11; a helical layer lamination step of laminating a plurality of helical layers 22 so as to totally cover the liner 10; and a thermosetting step of thermosetting the hoop layers 21 and the helical layers 22 both having been laminated.

In the hoop layer lamination step, as shown in FIG. 2, the fibers 15 impregnated with the epoxy resin are hoop-wound from a side closer to the outer circumference of the body part 11 of the liner 10 toward a side farther from the outer circumference of the body part 11 so as to sequentially laminate the plurality of hoop layers 21. Specifically, in a state in which the liner 10 is fixed to a rotation driving unit (not shown) provided to a tank manufacturing apparatus, the liner 10 is rotated about the central axis L of the liner 10.

At the same time, while a resin fiber feeding roller 30 around which the fibers 15 impregnated with the epoxy resin are wound is reciprocated along the central axis L direction, the fibers 15 are fed out and conveyed toward the liner 10 side. At this time, the resin fiber feeding roller 30 is rotated in the same direction as the rotating direction of the liner 10.

Next, the fibers 15 are hoop-wound from one end (left end of the drawing surface in FIG. 2) of the body part 11 toward the other end (the right side in the drawing surface in FIG. 2) of the body part 11 so as to form a first hoop layer 21 on the outer circumference of the body part 11. Then, the fibers 15 are hoop-wound from the other end of the body part 11 toward the one end of the body part 11 so as to laminate a second hoop layer 21 on the outer side of the first hoop layer 21. Subsequently, a third hoop layer 21 is laminated on the outer side of the second hoop layer 21, a fourth hoop layer 21 is laminated on the outer side of the third hoop 1 ayer 21, . . . and then an N+1th hoop layer 21 is laminated on the outer side of an Nth hoop layer 21, sequentially.

Here, in order to reduce step differences at respective boundaries between the body part 11 and the dome parts 12, it is preferable to laminate the plurality of hoop layers 21 such that the left and right ends of the laminated hoop layers 21 are inwardly shifted in a stepwise manner so as to be inclined toward the central axis L direction. That is, the length of a cross section cut along the central axis L of the N+1th hoop layer 21 is shorter than the length of a cross section cut along the central axis L of the Nth layer hoop layer 21.

In the helical layer lamination step following the hoop layer lamination step, the fibers 15 impregnated with the epoxy resin are helical-wound in such a manner as to wrap the laminated hoop layers 21 and the dome parts 12, to thereby laminate the plurality of helical layers 22. In the helical layer lamination step of the present embodiment, the temperature of the fibers 15 impregnated with the epoxy resin is adjusted at 40° C. or more and 60° C. or less.

Here, the reason why the temperature of the fibers 15 impregnated with the epoxy resin is set at 40° C. to 60° C. will be described.

Generation of voids can be reduced by setting the temperature of the fibers 15 impregnated with the epoxy resin higher than an ordinary temperature. By setting this temperature higher than the ordinary temperature, the viscosity of the resin with which the fibers 15 are impregnated becomes lower, to thus increase the permeation property of the epoxy resin.

Further, the initial strength (also referred to as a burst strength) of the tank 1 is greatly influenced by a Vf (fiber volume content). The Vf is a proportion of the fibers in a predetermined area of a radial cross section of the tank 1, and is calculated by Vf=(fibers area/total area)×100%. The total area is a cross section of the FRP layer 20, and is formed of the fibers, the epoxy resin, and voids. Hence, by setting the Vf to be greater, the content of the fibers can be higher, and the initial strength is thus increased.

Figure 4:
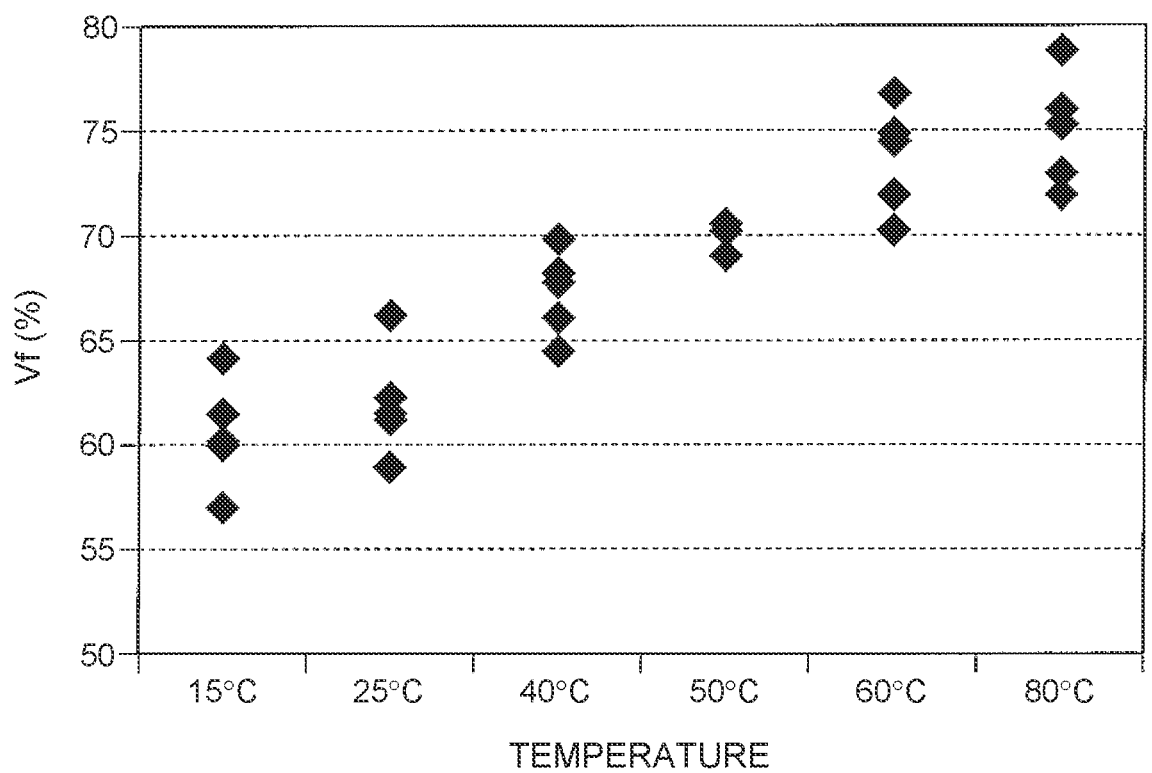
FIG. 4 is a view showing a relationship between a temperature of fibers impregnated with an epoxy resin and a Vf (fiber volume content) of a tank.

FIG. 4 is a view showing a relationship between a temperature of the fibers 15 impregnated with the epoxy resin and the Vf of the tank 1. As shown in FIG. 4, the Vf is gradually increased as the temperature becomes higher, and the initial strength of the tank 1 thus becomes higher. However, an excessively great Vf raises a problem such as deterioration of the fatigue strength of the tank 1. In order to enhance the strength of the tank 1, it is necessary to achieve both the initial strength and the fatigue strength.

To cope with this, the inventor of the present application has conducted intensive studies and has found that the initial strength and the fatigue strength of the tank 1 is compatible with each other if the temperature of the fibers 15 is set at 40° C. to 60° C. Specifically, the inventor of the present application has prepared samples under various temperature conditions, and has investigated the relationship between the temperature and the Vf for each of the prepared samples as well as influences on the initial strength and the fatigue strength by the temperature. The relationship between the temperature and the Vf shown in FIG. 4 is obtained based on the results from the actual investigation carried out by the present inventor.

On the other hand, regarding the influences on the initial strength and the fatigue strength caused by the temperature, the burst test and the cycle fatigue test were carried out under the following conditions. In the burst test, the pressure of the tank was boosted up to 126 MPa at a pressure boosting rate of 0.35 MPa/s using a water pressure, and this pressure was kept for 4 minutes in this state. Thereafter, the pressure boosting was continued until the tank ruptured, and then a pressure at the time of the rupture (i.e. the initial strength) of the tank was measured. In the cycle fatigue test, expansion and shrinkage of the tank at a pressure of 2 to 87.5 MPa was repeated at an ordinary temperature, and the number of cycles of expansion and shrinkage until the rupture or the leak of the tank occurred was evaluated. The results of the test are shown in Table 1.

TABLE 1

| Temperature (° C.) | Initial Strength (MPa) | More than 45000 cycles? |
|---|---|---|
| 15 | 185 | No (35000 cycles) |
| 45 | 205 | Yes |
| 80 | 220 | No (30000 cycles) |

According to Table 1, the initial strength of the sample of the tank prepared by adjusting the temperature of the fibers 15 at 15° C. is 185 MPa, and the number of cycles until the rupture or the leak is 35000 cycles. The initial strength of the sample of the tank prepared by adjusting the temperature of the fibers 15 at 45° C. is 205 MPa, and the number of cycles until the rupture or the leak is 45000 cycles or more. The initial strength of the sample of the tank prepared by adjusting the temperature of the fibers 15 at 80° C. is 220 MPa, and the number of cycles until the rupture or the leak is 30000 cycles.

Based on these test results, it is conceivable that, by setting the temperature of the fibers impregnated with the epoxy resin at 40° C. to 60° C., the fatigue strength of the tank can be maintained while the initial strength of the tank is enhanced.

Here, it is more preferable to set the temperature of the fibers impregnated with the epoxy resin at 40° C. or more and 50° C. or less. With this setting, it is possible to effectively achieve both the initial strength and the fatigue strength of the tank 1.

As the method of adjusting the temperature of the fibers 15 impregnated with the epoxy resin at 40° C. to 60° C. in the helical layer lamination step of the present embodiment, the following two methods can be listed, for example.

The first method is a method that adjusts the temperature of the fibers 15 impregnated with the epoxy resin by utilizing frictional heat generated by controlling the rotation of the resin fiber feeding roller 30. Normally, the resin fiber feeding roller 30 is rotated in the same direction as the rotation direction of the liner 10 while a constant tension is applied to the fibers 15 wound around the resin fiber feeding roller 30 so as to feed the fibers 15 toward the liner 10. In the helical layer lamination step of the present embodiment, by stopping the rotation of the resin fiber feeding roller 30 or by rotating the resin fiber feeding roller 30 in a direction reverse to the rotation direction of the liner 10, frictional heat is generated between the fibers 15 and the resin fiber feeding roller 30 to heat the fibers 15 by utilizing the frictional heat.

Regarding the temperature control about heating, measurement of the temperature of the fibers 15 is carried out by measuring the surface temperature of the liner 10 using a non-contact thermometer, for example.

When the measured temperature is less than 40° C., the rotation of the resin fiber feeding roller 30 is stopped, for example, and frictional heat between the fibers 15 and the resin fiber feeding roller 30 is utilized for heating the fibers 15. When a sufficient temperature rise of the fibers 15 cannot be obtained only by stopping the rotation of the resin fiber feeding roller 30, the resin fiber feeding roller 30 is brought to be reversely rotated (i.e. rotated in a direction reverse to the rotation direction of the liner 10) to generate a greater frictional heat, to thereby heat the fibers 15. On the other hand, when the measured temperature is more than 60° C., the resin fiber feeding roller 30 is brought to be rotated forward (i.e. rotated in the same direction as the rotation direction of the liner 10) to reduce the frictional heat, to thereby adjust the temperature.

In this way, as the temperature of the fibers 15 is adjusted by the frictional heat generated by controlling the rotation of the resin fiber feeding roller 30, the temperature adjustment of the fibers 15 can be achieved only by using existing facilities without providing additional facilities, thus maintaining the cost at a low level.

The second method is a method that heats the temperature of the fibers 15 by a heater (not shown) when the manufacturing apparatus is equipped with this heater. In this case, the temperature of the whole liner 10 may be heated up to 40° C. to 60° C. by using the heater, or only portions of the fibers 15 to be wound may be heated. With this configuration, it is possible to cope with the temperature adjustment of the fibers 15 by utilizing only the existing facilities, and also to prevent the fibers 15 from being damaged.

In the thermosetting step following the helical layer lamination step, the liner 10 including the hoop layers 21 and the helical layers 22 both having been laminated is placed in a constant temperature oven and heated, for example, at a temperature of about 85° C. so as to thermoset the epoxy resin in the fibers 15. The manufacturing of the tank 1 is thus completed.

In the manufacturing method for the tank 1 according to the present embodiment, by adjusting the temperature of the fibers 15 impregnated with the epoxy resin at 40° C. to 60° C. in the helical layer lamination step, to thereby decrease the viscosity of the epoxy resin with which the fibers 15 are impregnated and enhance the permeation property of the epoxy resin. Therefore, even in the case in which the orientation of the fibers 15 is changed when the layer-formation is switched from formation of the hoop layers 21 to formation of the helical layers 22 or the like, the permeation of the epoxy resin can be promoted, to thus reduce generation of voids.

In addition, by adjusting the temperature of the fibers 15 impregnated with the epoxy resin at 40° C. to 60° C., it is possible to achieve both the initial strength and the fatigue strength of the tank 1, thus promoting enhancement of the strength of the tank 1.

Although the embodiments of the present disclosure have been described above in detail, the present disclosure is not limited to the above-described embodiments, and various design changes can be made without departing from the spirit of the present disclosure described in the claims.

For example, in the aforementioned embodiments, it has been described that the temperature of the fibers 15 is adjusted at 40° C. to 60° C. during the helical layer lamination; however, if necessary, the temperature of the fibers 15 may be adjusted at 40° C. to 50° C. also during the hoop layer lamination. In the aforementioned embodiments, as the method of adjusting the temperature of the fibers 15 impregnated with the epoxy resin, the method of utilizing frictional heat generated by controlling the rotation of the resin fiber feeding roller 30 or the method of using a heater has been exemplified; however, these methods may be used in combination or equipment such as heating nozzles may be used, if necessary.

What is claimed is:

1. A manufacturing method for a tank that manufactures the tank by winding fibers impregnated with a resin in a plurality of layers on an outer circumference of a liner, the manufacturing method comprising:
    laminating a plurality of hoop layers by hoop-winding the fibers impregnated with the resin; and
    laminating a plurality of helical layers by helical-winding the fibers impregnated with the resin such that the helical layers wrap the hoop layers, wherein
    when laminating the helical layers, a temperature of the fibers impregnated with the resin is adjusted at 40° C. or more and 60° C. or less.

2. The manufacturing method according to claim 1, wherein
    when the tank is manufactured by using a manufacturing apparatus equipped with a resin fiber feeding roller feeding the fibers impregnated with the resin,
    when laminating the helical layers, the temperature of the fibers impregnated with the resin is adjusted by frictional heat generated by controlling a rotation of the resin fiber feeding roller.

3. The manufacturing method according to claim 1, wherein
    when the tank is manufactured by using a manufacturing apparatus equipped with a heater,
    when laminating the helical layers, the temperature of the fibers impregnated with the resin is adjusted by the heater.

4. The manufacturing method according to claim 1, wherein when laminating the helical layers, the temperature of the fibers impregnated with the resin is adjusted at 40° C. or more and 50° C. or less.

5. The manufacturing method according to claim 2, wherein
    the controlling of the rotation of the resin fiber feeding roller includes:
    rotating the resin fiber feeding roller in the same direction as a rotating direction of the liner;
    rotating the resin fiber feeding roller in a direction reverse to the rotating direction of the liner; and
    stopping the rotation of the resin fiber feeding roller.

* * * * *